UNITED STATES PATENT OFFICE.

LEWIS BENJAMIN, OF WASHINGTON, DISTRICT OF COLUMBIA.

IMPROVEMENT IN CANDY.

Specification forming part of Letters Patent No. 173,756, dated February 22, 1876; application filed February 16, 1876.

*To all whom it may concern:*

Be it known that I, LEWIS BENJAMIN, of Washington city, District of Columbia, have invented a new and useful Improvement in Candy; and I do hereby declare the following to be a full, clear, and exact description of the same.

The object of my invention is to produce a new article of candy, which will utilize the common molasses candy or taffy so that a nice and cheap article may be offered to the public.

The nature of the invention consists in combining the common molasses candy or taffy with sugar-candy, as hereinafter described.

The common molasses candy or taffy, made of molasses and brown sugar, cannot well be made during warm weather on account of its property of melting at the ordinary temperature of the summer season, and thus becoming sticky and unpleasant to handle. I have found that this difficulty can be overcome by combining sugar-candy with the other articles so that the manufacture may be carried on without regard to the temperature of the season, and this I accomplish in the following manner:

A sheet of sugar-candy in a plastic condition is first prepared, and on this is placed a sheet of molasses candy or taffy of less diameter than the former, (the latter being also in a plastic state,) and these two layers are then rolled together so as to make a stick of the ordinary size of candy. If it be desired to use the molasses candy or taffy in the manufacture of drops, balls, cakes, or any other form of candy, this can be done on the same principle as that above described, or in any other suitable manner.

It will thus be seen that I have made an article of candy which has a hard exterior, capable of resisting the ordinary heat of summer, and which incloses the soft article which has not heretofore been available for the reasons before given.

I am aware that various kinds of articles have heretofore been inclosed in sticks of candy for purposes of embellishment and flavor, and I do not, therefore, claim such articles; but

What I claim as my invention, and desire to secure by Letters Patent, is—

As an article of manufacture, candy made of common molasses candy or taffy and sugar-candy combined in the manner above described, so as to be made into stick-candy, drops, cakes, or any other form of confectionery, for the purposes set forth.

In testimony that I claim the foregoing I have hereunto set my hand and seal this 16th day of February, 1876.

L. BENJAMIN. [L. S.]

Witnesses:
D. SMITH,
T. C. SMITH.